Sept. 3, 1929.  E. F. SUTTON  1,727,140
BEET HARVESTER
Filed May 14, 1927    4 Sheets-Sheet 4
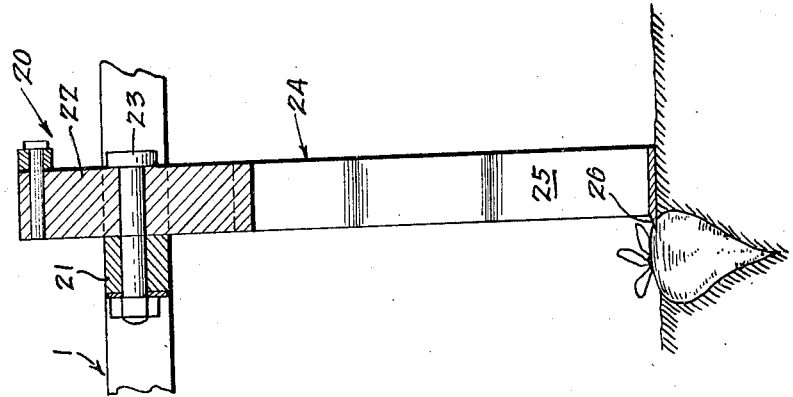
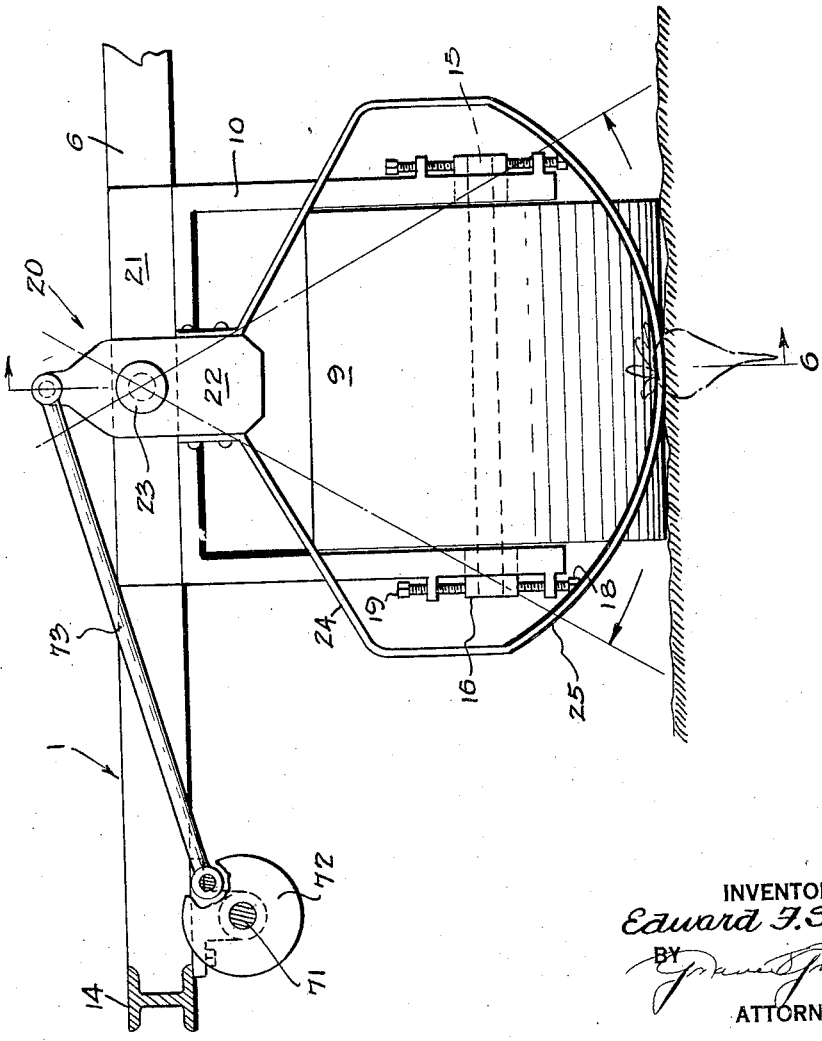
INVENTOR
Edward F. Sutton
BY
ATTORNEY Patented Sept. 3, 1929.

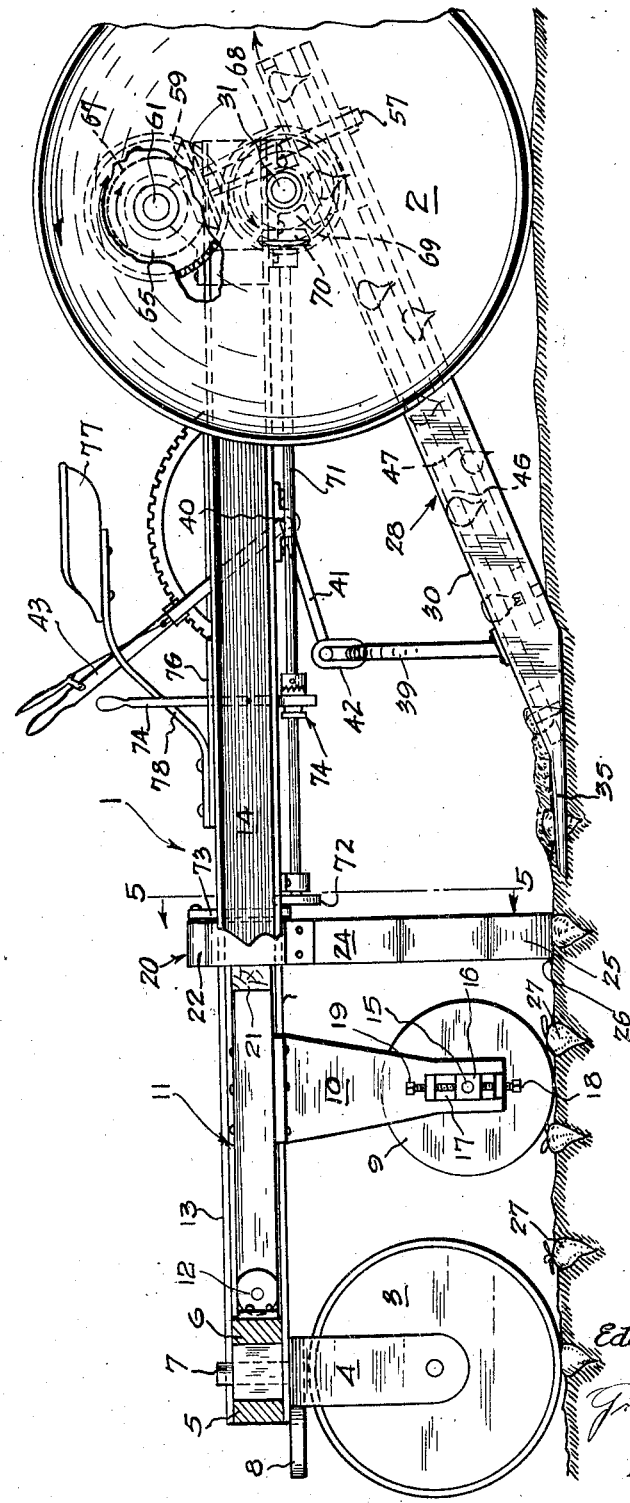

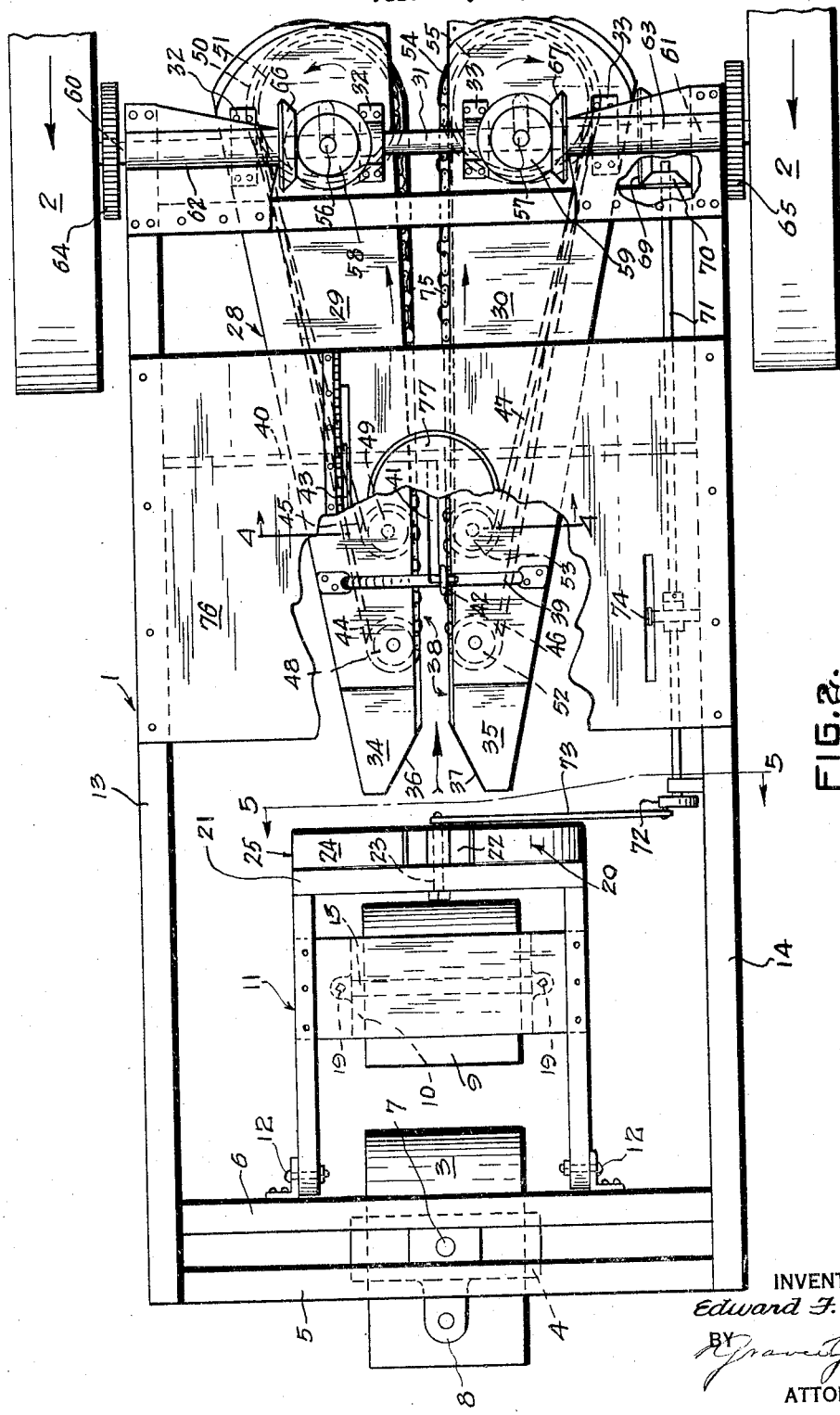

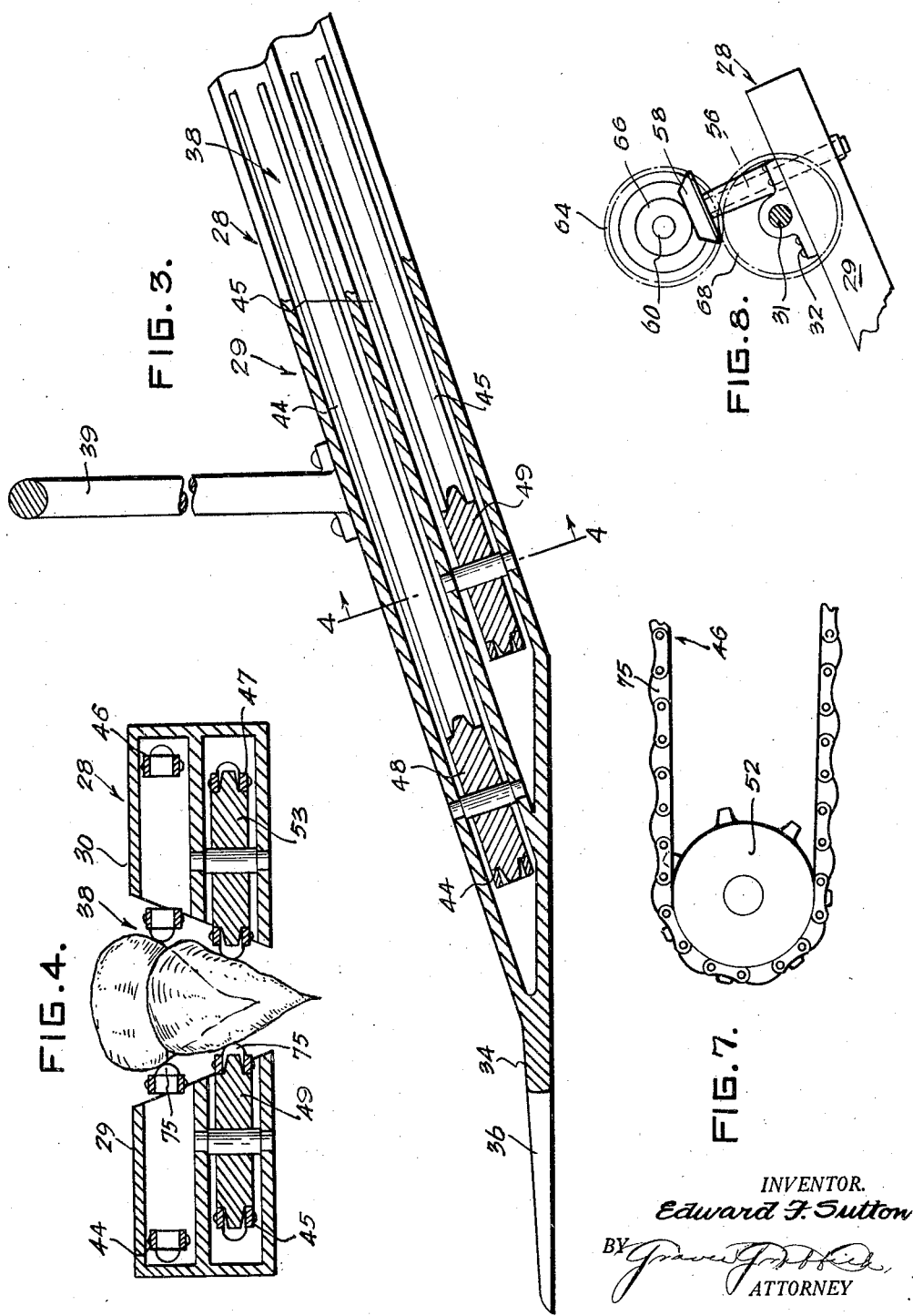

1,727,140

UNITED STATES PATENT OFFICE.

EDWARD F. SUTTON, OF SALT LAKE CITY, UTAH.

BEET HARVESTER.

Application filed May 14, 1927. Serial No. 191,362.

This invention relates to improvements in beet-harvesting machines and has for its primary object the provision of a device of the class designated that embodies in its construction means for topping the beets, means for extracting and grading them, and means for conveying the extracted beets to a position in the rear of the machine.

A further object of the present invention is that of providing a novel beet-topping mechanism provided with means for its automatic adjustment relative to the varying heights of the beet tops above the ground and its ready accommodation to the inequalities thereof preliminary to the severance of the tops from the beets.

Another object of the invention is to provide a device of the character designated having in combination a novel beet extracting means and a plurality of conveyors, so designed and arranged in the frame of the machine as to be adjustable, to permit of varying the depth to which the device may be made to extend below the surface of the ground to regulate the depth-action thereof.

An additional object, and one of first importance and dependent upon the foregoing, in measure, is that of the utilization of the forward movement of the machine, in conjunction with the rearward movements of the plurality of conveyors, for the creation of a resultant force wherethrough the beets are caused to be "lifted" directly from the ground and, later, dropped upon the spot they originally occupied.

Other objects and advantages of my invention will become apparent as this specification progresses, and be more clearly set forth in the claims. In the accompanying four sheets of drawings, forming a part of this specification, and in which similar characters of reference refer to like parts, throughout:

Figure 1 is a side elevation of the machine showing the plow and conveyor mechanism in operative position;

Figure 2 is a top plan view of the machine showing the plow and conveyor mechanism and driving means therefor;

Figure 3 is an enlarged fragmentary view illustrating the plow and conveyor mechanism in detail;

Figure 4 is a sectional detail of the plow and conveyor mechanism, the section being indicated by the line 4—4 in Figures 2 and 3;

Figure 5 is an enlarged sectional detail of the beet topping mechanism, as indicated by the line 5—5 in Figures 1 and 2;

Figure 6 is a sectional detail of the beet topping mechanism taken at right angles to Figure 5, as indicated by the line 6—6 in Figure 5;

Figure 7 is a detail view of a portion of one of the conveyor sprockets and chains; and Figure 8 is a sectional detail of a portion of the rear axle illustrating the extracting member driving means.

The accompanying drawings illustrate the preferred embodiment of my invention. In detail, the machine illustrated consists of a rectangular frame 1 mounted upon rear wheels 2 and a front wheel 3, the whole constituting a trailer adapted to be coupled to a tractor, or drawn by horses, as conditions may demand.

The front wheel 3 is mounted in a yoke 4, this yoke being revolubly mounted relative to the cross braces 5 and 6 of the frame by means of a king-pin 7, the front of the yoke being provided with a short tongue 8 to which any connection may be made for draught purposes. Rearwardly of the front wheel 3 is mounted a roller 9, this roller being carried by a yoke 10 which is rigidly secured to the underside of a frame 11 hingedly secured to the brace 6 by means of hinge members 12, to permit compensation for irregularities of the ground and inequalities in the heights of the beets, the brace 6 being, in turn, secured to the longitudinal supports 13 and 14. The shaft 15 of the roller 9 is mounted in bearing blocks 16, the said blocks being adjustable vertically in the slots 17 by means of adjusting screws 18 and 19, as clearly shown in Figure 1. The roller 9 rolls upon the ground rearwardly of the wheel 3 and in front of and in close proximity to the beet cutting, or topping, mechanism 20, which is carried by the frame 11, as hereinafter described.

The beet topping mechanism 20 is mounted upon a transverse brace 21 of the frame 11, and consists of a centrally positioned member 22 pivotally mounted upon the brace 21 by a bolt, or the like, 23, and has bolted at opposite side edges thereof a metal frame 24, which is provided with an arcuately arranged lower segment 25, this segmet being sharpened on its forward edge to provide a cutting blade 26 adapted to contact and shear off the tops of the beets 27 as said segment is adjustably advanced over the surface of the ground by the forward movement of the machine. The cutting mechanism 20 is oscillated about its pivot 23 as it is moved forward, as hereinafter described.

The beet extractor 28, is of duplex construction and consists of a pair of angularly disposed casings 29 and 30 having their rear ends "swung" under the rear axle 31 by means of sets of supporting brackets 32 and 33 and their forward ends flattened to form plow points 34 and 35, having inner rearwardly converging edges 36 and 37.

The casings 29 and 30 are spaced apart substantially, as shown in Figure 2, to form a conveyor trough 38 extending longitudinally the full length thereof, the members of which are rigidly secured together near their forward ends by means of a yoke 39 and adapted to swing in unison upon the rear axle 31 of the machine, as hereinafter described.

The casings 29 and 30 are adjusted to properly position, as to depth, the plow points 34 and 35 in the earth by means of a rock shaft 40, arm 41, and link 42, the link 42 being made to embrace the yoke 39. The rock shaft 40 is manipulated by means of a lever 43 mounted upon the longitudinal support 13 of the frame 1.

The extractor casings 29 and 30 are provided with a plurality of sets of superposed conveyor chains 44, 45, 46 and 47 carried, respectively, by sprocket wheels 48, 49, 50, 51, 52, 53, 54 and 55, these being journalled in opposite ends of the casings as shown in Figures 2, 3 and 4.

The sprockets 50, 51, 54 and 55 are journalled in the rear ends of the casings 29 and 30, respectively, by means of angularly disposed shafts 56 and 57, said shafts carrying at their upper ends bevel gears 58 and 59, as shown in Figures 1 and 2. Drive shafts 60 and 61 are mounted upon the rear end of the frame 1 and are carried by supporting brackets 62 and 63, these being rigidly mounted upon the rear corners of the longitudinal supports 13 and 14 of the frame. These shafts are provided at their outer ends with bevel gears 66 and 67 adapted to normally mesh with the bevel gears 58 and 59.

The gears 64 and 65, in turn, mesh with gears 68 carried by the main axle 31 of the machine, so that when the machine is moved ahead over the ground the rear wheels 2 are rotated in the direction of the arrows in Figures 1 and 3, this rotary movement of the wheels and axle 31 causing the rotation of gears 64 and 65 and the bevel gears 58, 66, 59 and 67, and the consequent rearward movement of corresponding inner sections of the conveyor chains.

The rear axle 31 is additionally provided with a bevel gear 69, as shown in Figures 1 and 2, which is adapted to mesh with a smaller bevel gear 70 carried by a shaft 71 mounted adjacent to and parallel with the longitudinal support 14 of the frame. The shaft carries a crank member 72 at its inner end, this crank member being connected to the member 22 of the topping mechanism 20 by means of a connecting rod 73, and, as the shaft 71 is rotated by the bevel gears 69 and 70, the topping mechanism 20 is oscillated crosswise about its pivot 23 to cause its cutting edge 26 to shear off the beet tops. The shaft 71 is provided intermediate thereof with a clutch mechanism 74, conveniently arranged to be reached by the operator of the machine, to disconnect the beet topping mechanism, when desired.

The conveyor chains 44 and 45 are, preferably, set in staggered relation, as shown in Figure 4, and the conveyor chains 46 and 47 are arranged in a like manner and form therebetween a substantially V-shaped trough, this arrangement of conveyors tending to grade and convey the beets rearwardly and to discharge them at the end of the machine, from whence they may be further conveyed to loading points by any suitable means, not shown.

The conveyor chains consist, each, of a plurality of links having formed between each link beet-gripping sections 75, as clearly shown in Figures 2 and 7.

It will be apparent from the foregoing description that, as the machine is moved forwardly over the ground, the plow points 34 and 35 will straddle a row of beets and operate to lift the beets one by one, through the resultant action induced by moving the machine and the conveyors in opposite directions at equal speeds, and to carry them, by means of the plurality of conveyors, along the trough-shaped incline to be discharged to the rear of the machine and over, or near, the point from which they were removed, or, by additional conveyors not shown, to any means that may be provided for their loading and transportation, the proportionate ratios of the gears 64, 65, 68, 66, 67, 58 and 59 being such as to meet these requirements.

A platform 76 is mounted transversely of the frame and is provided with a seat 77 mounted upon a spring member 78, affording the operator, when seated thereupon, a convenient position from which to manipulate the control lever 43 and the clutch mechanism 74, for the necessary and ready adjustment of the various parts of the apparatus.

When it is desired to render the member 28 inoperative for transportation purposes, the lever 43 is manipulated to cause the rocking of shaft 40 and the upward swinging movement of arm 41, movements which raise the member 28 clear of the ground and disengage the bevel gears 58 and 59 from the bevel driving gears 66 and 67.

While a preferred and simplified construction of my device has been illustrated and described, it is not the intent to be thus restricted, as it is obvious that many modifications and equivalents may be employed in its construction without departing from the spirit of my invention.

Having thus described my invention, I claim and desire to secure by Letters Patent:

1. In a beet harvesting machine, the combination with a trailer frame having a rear axle, driving wheels and a steering wheel, of a beet extracting member mounted upon said rear axle and extending forwardly and angularly therefrom and having plowshares formed at its free end and adapted to straddle a row of beets, means carried by said frame for adjustably supporting the free end of said extractor, a pivotally secured frame mounted in said trailer frame, a beet topper mounted in said last mentioned frame forwardly of and in close proximity to said extractor, crank means for oscillating said beet topper to top the beets in advance of the extractor, roller means carried by said topper for positioning the same relative to the beets, and means for actuating said beet extractor.

2. In a beet harvesting machine, the combination with a trailer frame having a rear axle, driving wheels and a steering wheel, of a beet extracting member mounted upon said axle and extending forwardly and angularly therefrom, said extracting member consisting of duplex casings having mounted therein superposed sets of conveyor chains and forming therebetween a V-shaped trough, plowshares formed at the free ends of said casings and adapted to straddle a row of beets, means carried by said frame for adjustably supporting the free ends of said casings, a pivoted frame mounted in said trailer frame, a beet topper mounted in the last mentioned frame in advance of said extractor and consisting of a frame mounted for oscillation transversely of a row of beets and having a cutting edge adapted to contact and shear the tops thereof, compensating means in the form of a roller carried by said pivoted frame for adjusting it to each beet, means for actuating said beet topper, and means for driving said conveyor chains.

3. In a beet harvesting machine, the combination with a trailer frame having a rear axle, driving wheels and a steering wheel, of a beet extracting member mounted upon said axle and disposed forwardly and angularly therefrom, said extracting member consisting of duplex casings having mounted therein pairs of superposed conveyor chains forming therebetween a V-shaped trough adapted to receive the beets as extracted by said extracting member, a pivoted frame mounted in the trailer frame, a beet topping mechanism mounted in said pivoted frame and positioned forwardly of said extracting member, roller means associated with said topping mechanism for positioning the same relative to successive beets in a row, crank means for oscillating said topping mechanism transversely of the direction of the travel of the machine to shear the top of each successive beet, and means carried by said rear axle for actuating said extracting member conveyor chains in unison to extract and carry the extracted beets rearwardly toward the end of the machine.

In testimony whereof, I hereby affix my signature this 7th day of May, 1927.

EDWARD F. SUTTON.